2,840,486

Patented June 24, 1958

2,840,486

COMPOSITION OF MATTER CONTAINING PIGMENT AND CHLORINATED POLYPHENYL

Samuel N. Hunter, East St. Louis, Ill.

No Drawing. Application April 23, 1956
Serial No. 579,715

3 Claims. (Cl. 106—287)

This invention relates to compositions for use as putty or the like. It has particular utility to under-water applications in which a hard protective surface is desired, but its utility is not confined thereto. This application is a continuation in part as to common subject-matter of my application Serial No. 281,910, filed April 11, 1952, now Patent No. 2,743,188.

One of the objects of this invention is to provide a composition which is capable of hardening even in underwater applications; which can be pigmented, painted, lacquered, enameled or varnished; which is fire resistant and which has a high adhesion to wood, even when the wood is damp, glass or metal.

Other objects will become apparent to those skilled in the art in the light of the following description.

In accordance with this invention generally stated, chlorinated polyphenyl of high chlorine content is rendered liquid, admixed with pigment, which preferably includes a modified clay of the character described in United States patent to Houser, No. 2,531,427, to form a composition which can readily be applied to a surface or opening. The composition subsequently hardens to a water-impermeable mass which, however, adheres strongly to the surface to which it is applied.

As an illustrative example of this invention, chlorinated polyphenyl containing 65% chlorine, and chlorinated polyphenyl containing 60% chlorine are dissolved in trichloroethylene in the proportions by weight of 30% of the 65% chlorine content polyphenyl, 10% of the 60% chlorine content chlorinated polyphenyl and 60% trichloroethylene. Pigment, amounting to 50% by weight of the above wetting agent is mixed with the wetting agent to form a pasty mass. This pigment, which may be of any suitable sort such, for example, as any of the pigments set out in my Patent No. 2,713,006, preferably includes some organophilic cation-modified clay such as dimethyl dioctadecyl ammonium bentonite, for example 1 to 20% by weight of the pigment.

The following are illustrative examples of compositions of this invention:

Example I

Wetting agent _____ 85–50% by weight
    30% chlorinated polyphenyl containing 65% chlorine
    20% chlorinated polyphenyl containing 60% chlorine
    50% toluene
Pigment _____ 15 to 50% by weight
    99% cuprous oxide
    1% dimethyl dioctadecyl ammonium bentonite

Example II

Wetting agent _____ 45–75% by weight
    30% chlorinated polyphenyl containing 65% chlorine
    10% chlorinated polyphenyl containing 60% chlorine
    60% trichloroethylene
Pigment _____ 55–25% by weight
    Titanium dioxide

Example III

Wetting agent _____ 85–60% by weight
    40% chlorinated polyphenyl containing 65% chlorine
    10% chlorinated polyphenyl containing 60% chlorine
    40% diacetone
    10% tricresylphosphate
Pigment _____ 15–40% by weight
    10% ultramarine
    90% dimethyl dioctadecyl ammonium bentonite Various solvents, diluents, and plasticizers, can be used to make up the wetting agent, so long as the major proportion of the residual matrix for the pigment is a chlorinated polyphenyl having at least 60% to 65% chlorine content. Such solvents, diluents and plasticizers include by way of illustration, chlorinated, halogenated, and hydrogenated resins; waxes or gums; chlorinated oils; silicone resins; silicone solutions; alkylenes (unsaturated hydrocarbons); polyalkylene glycols, polyethylene, polystyrene or their derivatives; unsaturated petroleum polymers (polymerized olefinic hydrocarbons); furfural; diphenyl ether; chlorinated diphenyl ether; furan; olefine; olein; oleo resins; oleic acid; palmitic acid; dibutyl phthalate, amyl acetate and tri-cresyl phosphate; and aromatic alicyclic benzene derivatives; paraffin oil, toluene, xylene, orthodichloro benzene, ketones, alcohols, mesityl oxide, diacetone, and the like.

The term "polyphenyl" is used herein to designate a compound consisting of two or more linked phenyl radicals, e. g. biphenyl, terphenyl, tetraphenyl, and the isomers thereof.

The range of proportions of wetting agent to pigment may vary from 10 to 90%, depending upon the consistency desired and the application to be made.

Having thus described the invention, what is claimed and desired to be secured by Letters Patent is:

1. A composition of matter comprising pigment and a wetting agent containing both volatile and non-volatile ingredients and having as its major non-volatile ingredient chlorinated polyphenyl having a chlorine content of at least 60%.

2. The composition of claim 1 wherein the chlorinated polyphenyl is a mixture of chlorinated biphenyl having a chlorine content of 60% and chlorinated polyphenyl having a chlorine content of at least 65%.

3. A composition of matter comprising pigment and a wetting agent containing both volatile and non-volatile ingredients and having as its major non-volatile ingredient chlorinated polyphenyl having a chlorine content of 60 to 65%, said wetting agent constituting 10 to 90% of the composition, by weight.

References Cited in the file of this patent

UNITED STATES PATENTS

| | | |
|---|---|---|
| 1,975,072 | Booth | Oct. 2, 1934 |
| 2,025,929 | Young | Dec. 31, 1935 |
| 2,531,427 | Hauser | Nov. 28, 1950 |
| 2,622,987 | Ratciffe | Dec. 23, 1952 |
| 2,713,006 | Hunter | July 12, 1955 |
| 2,743,188 | Hunter | Apr. 24, 1956 |